Oct. 13, 1970   J. L. LILJEQUIST   3,533,229
TILTING TIMERS
Filed May 26, 1969
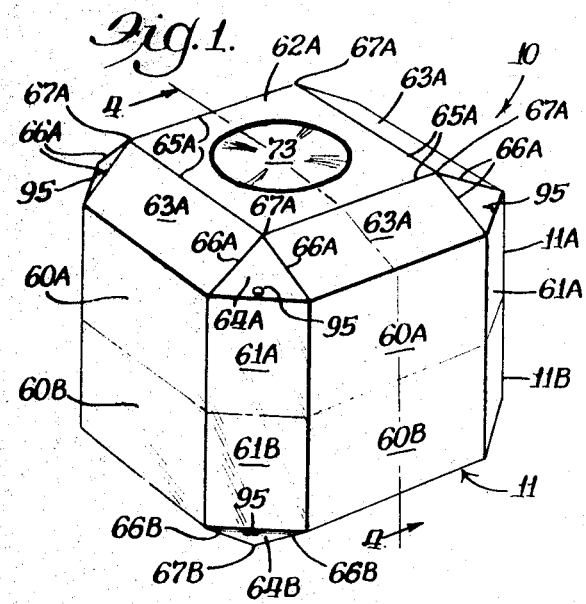
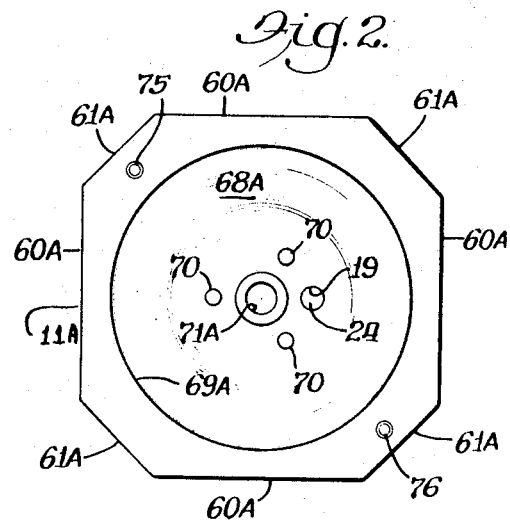
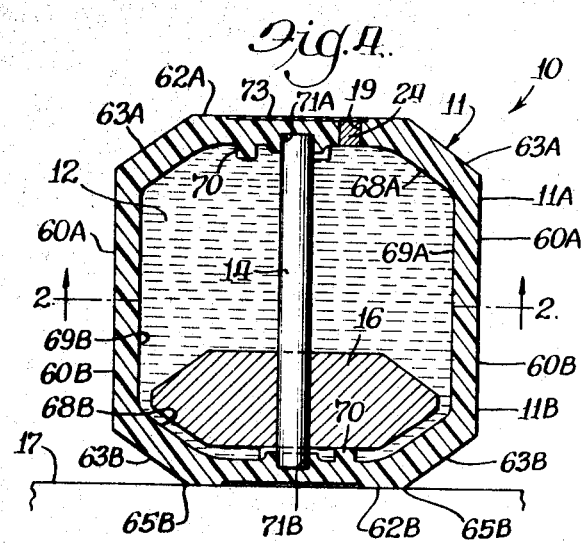
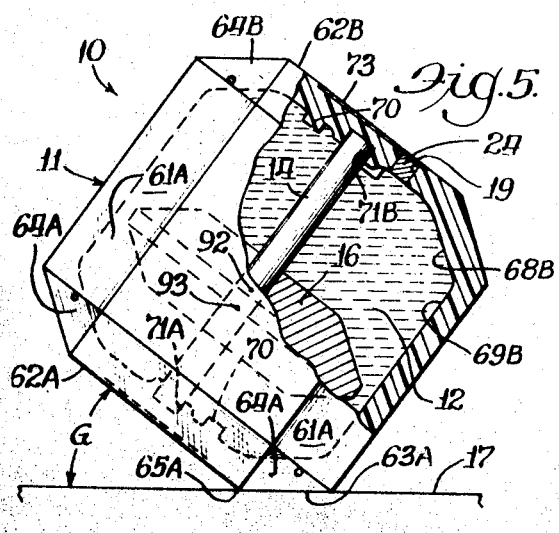
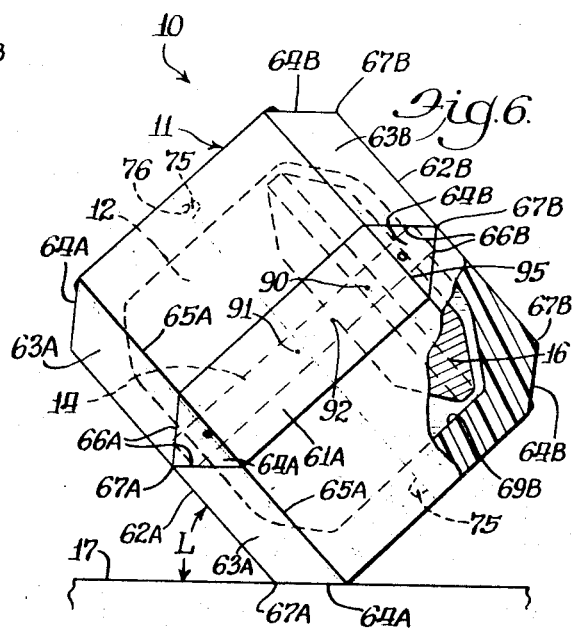
Inventor:
Jon L. Liljequist

United States Patent Office 3,533,229
Patented Oct. 13, 1970

3,533,229
TILTING TIMERS
Jon L. Liljequist, 801 S. Elmhurst Ave.,
Mount Prospect, Ill. 60056
Filed May 26, 1969, Ser. No. 827,517
Int. Cl. G04f 1/06
U.S. Cl. 58—144                              7 Claims

ABSTRACT OF THE DISCLOSURE

An improved version of the type of device which when rested in a particular orientation on a hard and level surface will remain stable in that position for only a relatively short period of time before tipping over due to the movement of its center of gravity laterally beyond its base of support. In addition to the foregoing, the present invention tips twice during a given interval and features a movable and disc shaped weight within a cubical housing.

BACKGROUND OF THE INVENTION

This invention relates to discoveries in and improvements to the general class of device covered by my issued U.S. Pat. No. 3,306,029. The improved device as described herein has a similar number of uses, among which are those of a novelty item, a short duration timer, a paperweight, or any combination thereof.

Pat. No. 3,306,029 shows and describes several timing devices which utilize the metered movement of a gravity actuated mass to assist in measuring the passage of time. While these devices show specific structure by which the invention can be accomplished, the invention more accurately goes to the concept of causing the mass support or timer itself to lose its balance preferably upon the lapse of some predetermined period of time so as to pivot or topple and apprise its user that the period has lapsed. The specific internal structure used to achieve the tilting action was perhaps of secondary importance as compared with the external support surfaces which cause the device to function in its claimed manner.

During the course of developing a marketable version of the device, not only was a superior and particularly sensitive structure created, but in testing the improved version there was discovered a new mode of operation which was entirely unanticipated and which enhances its functional aspects.

This development centered around a structure having the external configuration of a fully faceted cube, in a broad sense similar to the shape shown in FIG. 5 of my U.S. Pat. No. 3,306,029. While a crude model of the embodiment there shown was constructed, the model was not nearly as complete as that figure shows, and it was never as sophisticated structurally or functionally as the device to be described.

SUMMARY OF THE INVENTION

The present invention involves several aspects. One deals with mode of operation, and another deals with specific structure.

During the course of perfecting a gravity activated and invertible timer having the external appearance of a fully faceted cube, it was discovered that the device could be made with certain proportions so that it could be inverted and balanced on a corner facet. After a substantial downward and lateral movement of the internal mass, the device would become unstable on the corner facet and tip. However, the device did not tip upright as was expected. Instead, it tipped sideways (nearly 90° from the direction of movement of the internal mass) to one of the two adjacent end facets and then continued to function until it became unstable in this position, whereupon it tipped again, this time to its upright position.

What is particularly significant is that the first tip takes place after about ½ to ¾ of the entire period has lapsed, this fraction depending upon the specific design and other factors. Thus, when the device is inverted and balanced on a corner facet, it thereafter gives a preliminary warning to its user that part or most of the time has lapsed by tipping a first time, thereby preparing him for the second and final tip which signals the end of the total period.

The second phase of this invention deals with specific structural features which not only permits this new and novel use, but which permits a particularly attractive model to have a significant degree of sensitivity to thereby ensure consistency in the timing function. In achieving this, there is required a delicate interrelationship in size, weight, and angles as between the inner portions and outer configuration of the device. However, outside of these dimensional relationships, the inner and outer design can each take various forms independently of the other.

While the invention is shown in the drawings to assist in an understanding of one preferred form of the invention, this showing is not intended to limit the invention to the specific embodiment shown or to defeat that purpose of a patent which is to protectively cover all inventive concepts contained therein. The appended claims are the chief aid toward this purpose as it is these that point out the scope of the invention.

DESCRIPTION OF THE DRAWING

FIG. 1 is an exterior perspective view of one form of the device which embodies the principles of the present invention.

FIG. 2 is a plan view looking into the inside of one of the two identical shells which form the housing, this view taken generally along the line marked 2—2 in FIG. 4.

FIG. 3 is a perspective view of the internal actuator means of actuating mass.

FIG. 4 is a cross-sectional view of the device taken substantially along the lines 4—4 of FIG. 1.

FIG. 5 is a side elevation of the device, partially in cross section, however, in this drawing the device is balanced on an end facet and the actuator means is in a position consistent therewith.

FIG. 6 is another side elevation, partially in cross section and the device is here balanced on a corner facet and the movable actuator means in in a corresponding and consistent position therewith.

DESCRIPTION OF THE PREFERRED EMBODIMENT

Briefly, the device shown to illustrate the invention is one which, when inverted and balanced on the proper surface, will remain stable in that position for some period before the internal actuator means sufficiently shifts the center of gravity of the entire device laterally so as to render the device unstable in its placed position, whereupon it topples to some other surface. Although this particular embodiment is gravity actuated, and although it will be observed that in this embodiment I have preferred to utilize a viscous liquid to retard and meter the movement of the actuator means, these will be seen to be a matter of design choice.

Referring now to the drawings, there is shown a novelty and/or timer device 10 having a housing or main body 11 which consists of two substantially identical shells 11A and 11B, which when fitted together form an internal and entirely enclosed hollow or void 12. Within the housing is guide means which are shown herein as a rigidly mounted and centrally disposed guide shaft 14 on which is carried a movable mass 16. Mass 16 is preferably a solid and dense material so that its weight is a significant portion of the total weight of the device, and in the preferred embodiment it is constructed of cold rolled steel both because of that material's density and the facility with which it can be machined. It will be understood that the actuating mass 16 can slidably ride on the shaft 14 between its extremities under the influence of gravity when the shaft 14 is sufficiently inclined. This condition can be achieved by inverting the device and balancing it on a proper one of its facets on the surface of a reasonable hard and level supporting surface such as that shown at 17.

Means are provided for retarding or metering the downward movement of mass 16, and in this embodiment these means consist of a viscous fluid which fills the remaining portions of void 12. In the embodiment shown, the housing 11, shaft 14 and this viscous fluid are crystal clear. And, while various clear liquids are available, the better materials are those which exhibit extremely constant temperature-viscosity characteristics.

It will be understood that the rate of movement that the actuating mass 16 achieves along shaft 14, as caused by the pull of gravity, is due primarily to the clearance between the weight an adjacent internal sidewalls of the housing, the viscosity of the fluid, the buoyant weight of the movable mass, and the angle of shaft 14. Also of significance is the temperature, since increasing temperatures reduce viscosity, and this is why a relatively stable viscosity fluid is preferable. However, when the device is used in an environment with a relatively stable temperature, such as in an office building, the viscosity remains essentially constant.

Although the device is fully capable of timing a period in a manner comparable to the device shown in my issued Pat. 3,306,029, it will be seen that it possesses the additional capability of tipping twice during a given interval.

Referring now to the specific shape of the housing 11, it will be observed that the two halves of shells 11A and 11B are identical with the exception of a fill hole 19 in the end of shell 11A. The purpose of this hole is to permit filling the void with oil after the two halves are hermetically sealed together with the shaft 14 and mass 16 emplaced therein. After the void 12 is filled with oil, the fill hole 19 is plugged with a suitable plug 24. Since the hole 19 is drilled after the shells are molded, the mold is universal and therefore need have only one cavity. Thus, for the purpose of brevity, only half 11A will be described in detail, and the numbers assigned to its various parts will carry the suffix A. Corresponding parts on half 11B will have the same number, but with the suffix B.

Shell 11A has an outer shape made up of four rectangular sidewall surfaces 60A, each adjacent pair being joined together by one of four side facets 61A. At a right angle to sidewall surfaces 60A and side facets 61A, and spaced therefrom, is an end wall 62A. End wall 62A is joined to sidewalls 60A by means of four end facets 63A, and each of the four corners formed where the side facets and end facets come together is beveled to form a corner facet 64A.

Whereas that which was described in my Pat. 3,306,029 as composite supporting means involved only two surfaces, those corresponding to end walls 62 and end facets 63 of this disclosure, the composite supporting means of this disclosure additionally includes corner facets 64. And what was in the earlier patent described as a limited stability surface corresponds to surfaces 63 in this disclosure. However, this disclosure additionally includes what I shall define as initial or primary support means, these being corner facets 64A, and these coact with facets 63A to provide successive tips which is a new feature.

The edges formed by the intersections of the end wall 62A and each of the end facets 63A are in fact pivotal means, and are here marked 65A. Similarly, the lines of intersection formed by the intersection of end facets 63A and corner facets 64A are also pivotal means, and these are marked 66A. The corner or point formed by the intersection of each corner facet 64A with end wall 62A is marked 67A.

It is significant that the distance between the center of end wall 62A and point 67A is over 41% further than the perpendicular distance between the center of end wall 62A and axes 65A. This is the controlling factor among those contributing to the fact that shaft 14 is higher when the device is supported on a corner facet than when supported on an end facet. To give some representative physical proportions to a successful model which became the first commercial construction, the perpendicular distance from the center of the end wall 62A to the edge 65A is 60% of the perpendicular distance from the same center point to an extension of sidewall surfaces 60A. With this proportion, the acute angle "G" formed by an extension of an outer surface of end wall 62A with end facet 63A is about 38 degrees. With this angle between the end wall and end facets, and with the other aesthetic design followed and respected, the angle "L" between the extension of the outer surface of end wall 62A and any one of corner facets 64A is about 48⅓ degrees. However, the angle formed by an extension of the corner facet 64A with one of the adjacent end facets 63A is only of the magnitude of about 31 degrees. While these dimensions and their interrelation are not readily obvious from viewing the drawing or device itself, it will be seen later that they are particularly significant in the action of the device when it is being used in its improved manner.

Calculations on various pleasing shapes indicates that a moderately wide range of dimensions and angles can be successfully designed into a cube or modified cubical shape.

For example, and in general terms, the 60% figure above was varied between 50% and 66⅔%, and the 38-degree angle was varied, depending on many factors, between about 30 and 40 degrees. A particularly pleasing appearing model with a sculptured appearance was successful with the production of 52% and 32½ degrees. Naturally, however, the percentage of the total weight which the actuating mass comprises, as well as the distance it travels, are significant considerations in the specific selection.

Within this complex of external facets and walls is half of the void 12, which for the most part is defined by a cylindrically shaped inner sidewall 69A. Between internal sidewall 69 and the inner surface of end wall 62A, the void is defined by a surface 68A generally in the shape of a frustum of a cone. End wall 62A has a relatively constant thickness, but includes a few variations to be described next.

The inner surface of end wall 62A includes three equally spaced projections integrally molded therein in the forms of tabs 70. These tabs merely act as spacers which prevent actuating mass 16 from bottoming on the inner surface of the end wall 62A. If the design were such as to permit the mass to bottom, the mass would take an unusually long and unpredictable time to move away from that surface after inversion. Also molded into the inner surface of end wall 62A is a reinforced socket 71. Socket 71 is centrally located and is sized to receive one end of the guide shaft 14 as the halves are being assembled and hold it captive thereafter.

The outer surface of end wall 62A is recessed slightly in a circular shape to provide for the placement therein of a disc shaped trim strip 73. This trim strip 73 acts to cover the plug 24 as well as hide the tabs 70 and socket 71 from view, and it thus prevents these functional portions from detracting from the device's appearance.

Each of the halves also includes a tapered locating pin 75 and a tapered locating hole 76. These are symmetrically positioned. Thus, the pin in each half fits into the hole in the other half, and the pair of pin connections properly aligns the two halves to form the full cube.

Preferably, the wall thickness of each of the halves is as constant as possible to facilitate the molding process. This consideration to some degree dictated the shape of internal surfaces 68A and 68B, and these surfaces in conjunction with the desirability of getting the combination of the greatest internal mass to move the greatest distance was responsible for the cross sectional shape of the movable mass 16. Its periphery in plan view is circular both to facilitate manufacture as well as to permit it to ride down guide shaft 14 in any angular orientation, or even rotate thereon freely, without having its periphery hang-up on the inner sidewall 69. Because of this peripheral shape, the guide shaft 14 and centrally located hole through the mass 16 can both have circular cross sections since there is no preferred angular orientation for the mass 16.

Preparatory to a discussion of the operation of the device, it will be recalled that desirable functioning of the device requires a relatively delicate balance of the various dimensions, weights and angles. In the original commercial construction, the average specific gravity of all the materials used exclusive of the weight was approximately 1.2. Being steel, the specific gravity of the movable actuator is about 7.8. Since the ratio of the specific gravity of the actuator to the rest of the material is greater than the ratio of the volume of the rest of the material to the volume of the actuator, the actuator comprises over 50% of the total weight of the device. It is, of course, desirable that the movable mass be a significant portion of the total weight in order that the total or composite center of gravity shifts the greatest possible distance laterally.

The operation of the device is generally as follows. Assuming that the device 10 is sitting on one end wall, let us say on end wall 62B as shown in FIG. 4, the actuating mass 16 will be in its lowermost position so that it is resting on tabs 70B. The entire device is then lifted by hand off its support 17 and inverted so that the end wall 62B is at the top and the actuating mass 16 is adjacent thereto. It is then manually inclined and balanced with one of the cornet facets 64A in intimate contact with the supporting surface 17. This position is shown generally in FIG. 6 and denotes the start of the period to be timed.

The center of gravity of the actuating mass 16 is naturally always at its own geometrical center, and this is marked in FIG. 6 with the numeral 90. The center of gravity of all of the remaining material lies approximately at the point marked 91, and thus the combined or composite center of gravity is approximately midway between these two points, as at 92. Composite center of gravity 92 lies directly above corner facet 64A, and thus the timer is balanced in a stable position at this time.

As the actuating mass 16 slowly slides down guide shaft 14 under the influence of gravity and against the liquid damping, the centers of gravity 90 and 91 shift their position such that composite center of gravity 92 moves generally laterally and downwardly along the guide shaft 14. This movement of the mass 16 is both slow and reasonably uniform. When the mass gets down to the position shown generally in FIG. 5, this being about ½ to ¾ of the total travel, the timer topples sidewards and comes to rest on an end facet as shown generally in FIG. 5. This movement and accompanying noise from slapping onto the surface 17 gives the device's user a preliminary warning of the imminent end of the total time period being measured. Naturally, the timer could flop sidewards in either of two directions since there is a surface 63A to each side of each corner facet 64A. However, it is believed that since few if any surfaces can be perfectly level that the timer chooses whichever surface 63A is downhill from the corner facet 64A.

In the position of FIG. 5 it will be noted that the composite center of gravity 92 is directly above its new support surface 63A, and it is therefore once again stable in this position. However, as the weight moves laterally and downwardly, the composite center of gravity 92 also moves laterally and downwardly until, a short distance before the weight touches tabs 70A, the composite center of gravity reaches the point 93 which is directly above the pivotal axis or edge 65A. At this point the timer becomes unstable and it topples for the second time, this time dropping onto end wall 62A.

Since there does occur two separate movements which are not only spaced apart in time, but which are in generally different directions from one another, these movements are quite baffling to a new observer.

Assuming the device was inverted and originally balanced on a corner facet, it would appear that, as the vertical projection of the composite center of gravity approaches point 67A, the support that facet 64A provides becomes more and more tenuous in several different directions due to the convergence of pivotal axes 66A toward point 67A. The device is naturally susceptible to moving to a position of lower potential energy if such an opportunity arises. However, it cannot tip from the corner facet to the end wall directly until the vertical projection of the composite center of gravity passes over point 67A.

However, point 67A is just that, a point, and thus the surface 17 would have to be perfectly level for the center of gravity to move directly over it. Since perfectly level surfaces are essentially nonexistent, the center of gravity 92 normally moves across one of the pivotal axes 66A first. Thus, the device can and does pivot on one of the axes 66A and tips onto the adjacent end facet. Since the center of gravity has not yet reached point 67A, it cannot at this relatively early time tip directly to the end wall 62A without first slightly lifting the composite center of gravity, and this it cannot do. And, to make absolutely certain that the composite center of gravity cannot pass directly over or very close to point 67A so as to lose the two distinct and time-separated tips, surface 64A can either be crowned slightly or have a slightly protruding projection such as that shown at 95. This cocks the device slightly at an angle and keeps the center of gravity from passing directly over point 67A.

It is noteworthy that the first and second tips are not in the same direction, but rather more nearly at right angles to each other. As a result, there is little likelihood that the first tip will continue through into or trigger the second tip. Also, the direction of the first tip is toward the elongate dimension of the end facet 63A (from corner facet to corner facet) rather than in the shorter and less stable direction (from side wall to end wall).

Thus, no other form of carry-over of this movement is experienced, i.e., the timer drops to the end facet in a particularly definite and direct manner without rocking or wobbling.

With this new capability, the timer has the added attraction of timing three different periods, admittedly close in duration, but nevertheless different. For example, when set up to tip the second time at the end of three minutes and initially balanced on a corner facet, it moves first after about 2 minutes and second at about 3 minutes. However, if initially balanced on an end facet, it makes its only tip at about 2¾ minutes. This expanded capability is desirable to one who is occupied with other matters and would prefer a warning prior to the expiration of the entire period.

The device is also an unusually interesting blend of looks and function in that the function is not worked into the aesthetic design, or the aesthetic design built up around the function, but rather the aesthetic and functional design are intimately entwined.

I claim:

1. In a device having an external and limited stability surface on which it can be supported and from which it inherently topples to another external surface after the lapse of a given period of time, this toppling being caused by a shift in the center of gravity of the device from a first location of relatively high potential energy above said limited stability surface to a second location of lower potential energy laterally outside of the peripheral extremities of the limited stability surface, the improvement comprising: initial support means for initially supporting said device in a stable condition for a short duration in a position of generally higher potential energy than that of said first location and for relinquishing this initial support to said limited stability surface as a result of a change in position of said center of gravity, whereupon the device experiences a first topple from said initial support means to said limited stability surface and a second topple thereafter from said limited stability surface to said another external surface.

2. The improvement as set forth in claim 1, wherein said other external surface means includes pivotal means at the periphery thereof for causing said first topple to be in a direction generally transverse of said second topple.

3. The improvement as set forth in claim 2, wherein the external shape of said device is that of a parallelopiped having end facets and corner facets, said limited stability surface comprising one of said end facets and said initial supporting means comprising one of said corner facets.

4. The improvement as defined in claim 3, wherein said end facets are inclined at an angle of between generally 30 degrees and 40 degrees with an extension of said another surface.

5. In an invertible timer of the type having movable mass means carried therein which travels between a first position and a second position under the influence of gravity which thereby meters out the passage of time, said timer having a housing with an external surface upon which it can be balanced in a stable condition after inversion, said surface holding said timer in an orientation whereby the center of gravity of said mass means is constrained to move downwardly and laterally from an upper position above and within the peripheral limits of said surface to a lower position outside of the peripheral limits of said surface whereupon the timer tips over, the improvement comprising: said mass means being constructed of metal and having a substantially greater overall dimension transverse of its direction of movement than in its direction of movement to obtain a large product of weight and total movement, said mass means also having a central hole extending therethrough, said housing carrying an internal guide shaft centrally therein and through said central hole for maintaining said mass means in a specific orientation relative to said housing, and a viscous fluid totally entrapped within said housing and surrounding said mass means to dampen its free movement.

6. The improved timer as set forth in claim 5, wherein said housing includes means for causing said timer to tip two times for each inversion thereof.

7. The improved timer as set forth in claim 6, wherein said housing has the external configuration of a fully faceted cube including end facets and corner facets, said corner facets having a greater inclination than said end facets and being the initial support surface after inversion.

References Cited

UNITED STATES PATENTS 3,306,029   2/1967   Liljequist _____ 58—144

RICHARD B. WILKINSON, Primary Examiner

E. C. SIMMONS, Assistant Examiner